US010311665B2

(12) United States Patent
Witkowski

(10) Patent No.: US 10,311,665 B2
(45) Date of Patent: Jun. 4, 2019

(54) SYSTEM AND METHOD FOR TRAINING A TRANSMITTER

(71) Applicant: Gentex Corporation, Zeeland, MI (US)

(72) Inventor: Todd R. Witkowski, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/727,919

(22) Filed: Oct. 9, 2017

(65) Prior Publication Data

US 2019/0108704 A1 Apr. 11, 2019

(51) Int. Cl.
*G05B 19/00* (2006.01)
*G07C 9/00* (2006.01)

(52) U.S. Cl.
CPC .................... *G07C 9/00857* (2013.01); *G07C 2009/00412* (2013.01); *G07C 2009/00865* (2013.01); *G07C 2009/00888* (2013.01); *G07C 2009/00928* (2013.01)

(58) Field of Classification Search
CPC ...... G07C 9/00857; G07C 2009/00412; G07C 2009/00865; G07C 2009/00888; G07C 2009/00928
USPC .......................................................... 340/5.25
See application file for complete search history.

(56) References Cited

U.S. PATENT DOCUMENTS 5,630,208 A * 5/1997 Enge ...................... H04B 1/711 375/232
6,374,161 B1 * 4/2002 Iwai .................. H04L 12/40013 701/1
8,982,803 B1 * 3/2015 Zhang .................. H04B 7/0619 370/329
9,167,476 B2 * 10/2015 Kim ........................ H04W 4/06
9,858,806 B2 * 1/2018 Geerlings .............. G08C 17/02
2005/0088281 A1 * 4/2005 Rohrberg ........... G07C 9/00182 340/5.71
2007/0005749 A1 * 1/2007 Sampath .............. H04B 7/0417 709/223
2007/0176735 A1 * 8/2007 Blaker .................... B60R 25/24 340/5.22
2010/0080266 A1 * 4/2010 Zhang ................... H04J 13/102 375/140
2010/0159846 A1 * 6/2010 Witkowski ......... G07C 9/00857 455/70
2011/0158247 A1 * 6/2011 Toyoshima ........... H04L 49/109 370/401

(Continued)

OTHER PUBLICATIONS

"KEELOQ® Code Hopping Encoder", HCS301 Manual, Microchip Technology, Inc., 2001.

(Continued)

*Primary Examiner* — Kerri L McNally
*Assistant Examiner* — Thang D Tran
(74) *Attorney, Agent, or Firm* — Price Heneveld LLP; Brad D. Johnson

(57) ABSTRACT

A remote device configured to control operation of a remote electronic device, such as a garage door opener, is provided. A transmitter circuit may be configured to receive and transmit communications directed to the remote electronic device. The communications may include data arranged according to a plurality of the control packet formats, and communications to the remote electronic device may include data transmitted according to the plurality of control packet formats.

20 Claims, 7 Drawing Sheets

(56) References Cited

U.S. PATENT DOCUMENTS

| | | | | |
|---|---|---|---|---|
| 2012/0297681 | A1* | 11/2012 | Krupke | E05F 15/60<br>49/324 |
| 2013/0321127 | A1* | 12/2013 | Wilder | G05B 19/042<br>340/5.71 |
| 2014/0254466 | A1* | 9/2014 | Wurster | H04L 12/189<br>370/312 |
| 2014/0301400 | A1* | 10/2014 | Tatsumi | B61L 15/0036<br>370/394 |
| 2015/0228139 | A1* | 8/2015 | Geerlings | G08C 17/02<br>340/5.61 |
| 2015/0302731 | A1* | 10/2015 | Geerlings | G08C 19/28<br>340/5.24 |
| 2015/0302737 | A1* | 10/2015 | Geerlings | G08C 17/02<br>340/5.25 |
| 2015/0364033 | A1* | 12/2015 | Witkowski | G08C 17/02<br>340/5.25 |
| 2016/0267781 | A1* | 9/2016 | Papay | G08C 17/02 |
| 2016/0267782 | A1* | 9/2016 | Shearer | G08C 17/02 |
| 2016/0267783 | A1* | 9/2016 | Shearer | G08C 19/28 |
| 2016/0351099 | A1* | 12/2016 | Kim | G09G 3/2037 |
| 2017/0103599 | A1* | 4/2017 | Siegesmund | G07C 9/00857 |
| 2017/0230255 | A1* | 8/2017 | Joung | H04L 41/147 |

OTHER PUBLICATIONS

"AVR411: Secure Rolling Code Algorithm for Wireless Link", Application Note, Atmel Corporation, 2015.

* cited by examiner

SYSTEM AND METHOD FOR TRAINING A TRANSMITTER

TECHNICAL FIELD

The present application relates to barrier communication devices, and more particularly to a remote operator device for a barrier that is trainable.

BACKGROUND

Many conventional barrier operators include a communication interface that enables remote operation of the barrier operator via commands received from a transmitter through the communication interface. For instance, the communication interface for a barrier operator of a garage door may include wireless capabilities that can be utilized by the transmitter to wirelessly communicate a command to open or close the garage door. The transmitter in this context is often a handheld device provided by the manufacturer of the barrier operator to enable a person to remotely control the barrier.

In some cases, aftermarket or alternative manufacturer transmitters have been provided with the capability to learn a protocol or format of communications for operation of this barrier operator. This type of transmitter is often described as a “code learning” style of trainable transmitter. However, conventional “code learning” style trainable transmitters are capable of training to only one data format at a time. Another type of conventional trainable transmitter does not utilize the original transmitter at all, and instead relies on a “guess and test” method in which the trainable transmitter outputs one data format at a time, and relies on feedback from the user to select the correct format. This guess and test method can be cumbersome for a user to operate and ineffective due to the reliance on the user feedback.

SUMMARY OF THE DESCRIPTION

The present disclosure is directed to a remote device configured to control operation of a remote electronic device, such as a garage door opener.

In one embodiment, the remote device may include memory, a transmitter circuit, and a trainable controller. The memory may be configured to store a plurality of communication parameters pertaining to controlling operation of the remote electronic device, where each of the communication parameters corresponds to a control packet format. The transmitter circuit may be configured to receive and transmit communications directed to the remote electronic device. The communications may include data arranged according to a plurality of the control packet formats.

The trainable controller may be configured to operate in a training mode in which the data received by the transmitter circuit forms training data, and to determine the plurality of communication parameters based on the training data. The trainable controller may operate in an operative mode to direct the transmitter circuit to communicate data based on at least one of the plurality of communication parameters.

In another embodiment, a method of operating a remote electronic device is provided. The method may include wirelessly receiving communications directed to the remote electronic device. The communications may include data arranged according to a first control packet format and a second control packet format. The method may include determining a plurality of communication parameters based on the training data, where the plurality of communication parameters corresponds to the first control packet format and the second control packet format. The method may include wirelessly transmitting, to the remote electronic device, communications including an equipment command for operation of the remote electronic device, where the communications transmitted wirelessly include data based on at least one of the plurality of communication parameters.

In yet another embodiment, a vehicle for communicating a command to a remote electronic device is provided. The vehicle includes a transmitter circuit and a controller. The transmitter circuit is configured to receive and transmit communications directed to the remote electronic device. The communications may include data arranged according to a plurality of the control packet formats.

The controller may be configured to operate in a training mode in which the data received by the transmitter circuit forms training data. The controller may determine a plurality of communication parameters based on the training data for each of said plurality of the control packet formats. In an operative mode, the controller may direct the transmitter circuit to communicate data based on at least one of the plurality of communication parameters, where the data communicated from the transmitter circuit includes a command instruction corresponding to the command for the remote electronic device.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of “including” and “comprising” and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
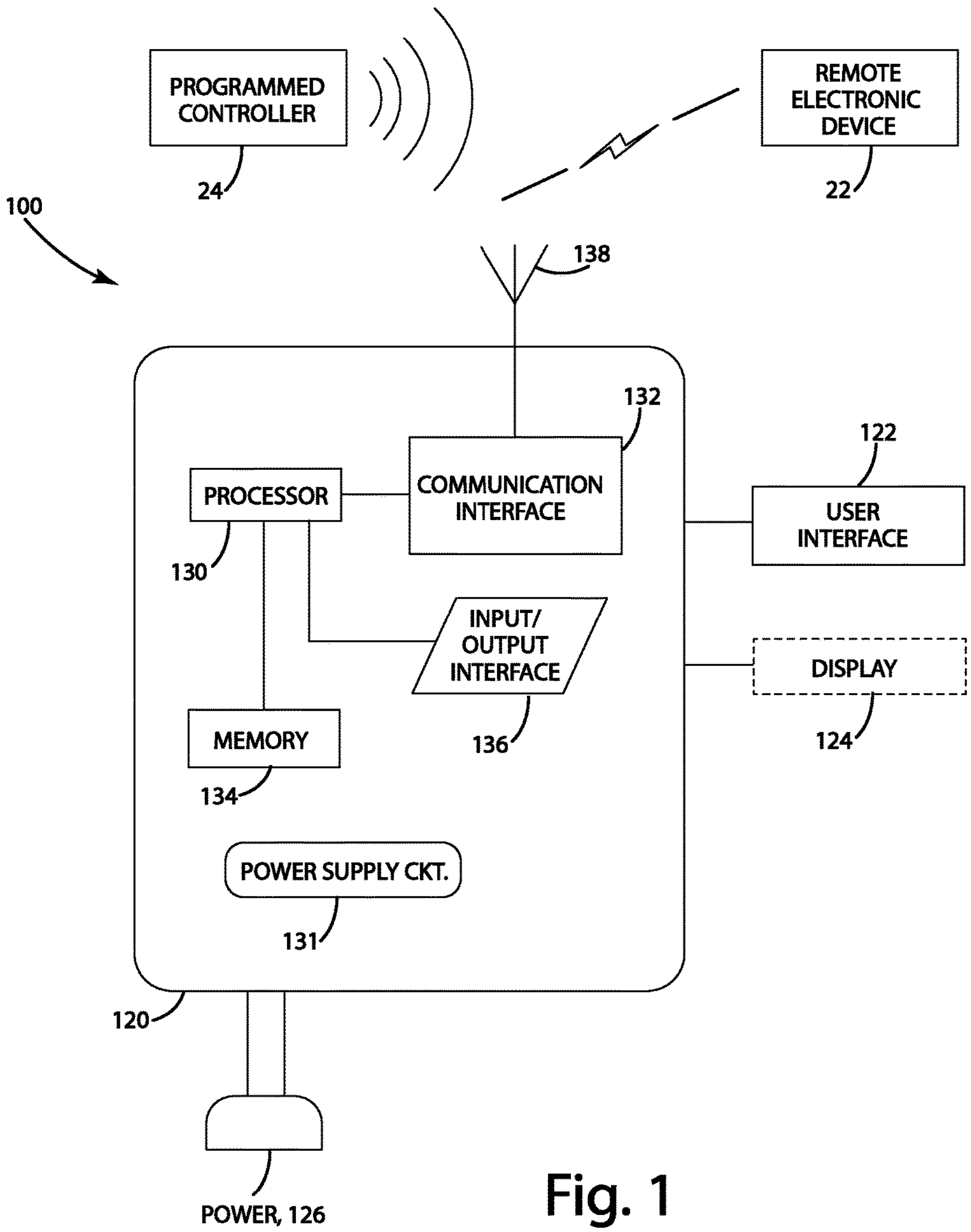
FIG. 1 depicts a representative view of a communication system in accordance with one embodiment.

A communication system for communicating with a remote electronic device is shown and generally designated 100 in the illustrated embodiment of FIG. 1. The communication system 100 includes the remote electronic device designated 22 and a pre-programmed device 24. The remote electronic device 22 may be a barrier operator (e.g., a garage door opener) or another type of remote electronic device capable of performing an action in response to receipt of a command. The pre-programmed device 24 may be associated with operation and communication with the remote electronic device 22 according to one or more control packet formats. For instance, the pre-programmed device 24 may be provided by the manufacturer of the remote electronic device 22 to facilitate remote operation of the remote device 22. A specific example of this relationship between the pre-programmed device 24 and the remote electronic device 22 is a garage door opener remote and a garage door opener.

The communication system 100 in the illustrated embodiment includes a remote device 120 that is trainable to communicate with the remote electronic device 22. After being trained, the remote device 120 may operate in the same or similar manner as the pre-programmed device 24 to communicate instructions to the remote electronic device 22 to initiate an action from the remote electronic device 22.

As garage door opener companies and other manufacturers of remote electronic devices 22 replace their existing products with those that utilize newer and more secure data formats, they may provide transmitters that output both old and new data formats so the consumer does not need to worry about which transmitter to buy. These transmitters may interleave two or more data formats (or control packet formats) when activated. In many cases, only one of the formats will activate the receiver of the remote electronic device 22. A conventional trainable transceiver is capable of training to only one data format at a time. This conventional trainable transceiver may be confused when multiple data formats are interleaved and not train at all, or it may train to a data format that is currently not being utilized. One embodiment according to the present disclosure provides a trainable transceiver configured to train to multiple data formats and output all of those formats (or a subset of those formats) when the trained channel is activated, thereby enabling the trainable transceiver to activate the receiver regardless of which of the multiple data formats the receiver is configured to respond to.

Many garage door opener companies are transitioning from 64-bit rolling code formats such as KeeLoq to more secure 128-bit formats such as AES. And rather than manufacture one transmitter that works with the older KeeLoq system and another that works with the newer AES system, the company may manufacturer one transmitter or a pre-programmed device 24 that is specifically programmed to output both formats and therefore works with both systems without the need to train to communicate with both systems. This is a cost savings for the garage door opener company, as they only have one part to manufacturer and stock, and it is easier for the end user, as there is no chance of them purchasing the wrong replacement transmitter for their system. When the customer pairs the transmitter to their opener, only the message corresponding to the receiver's data format is utilized, and the other message output by the transmitter is ignored. This type of transmitter confuses conventional trainable transceivers such as HomeLink, which are designed to detect only one data format at a time.

It should be understood that the pre-programmed device 24 provided from the manufacture is not configured to be trained to communicate according to multiple control formats. The pre-programmed device 24 is programmed at manufacture to communicate according to the multiple control formats. The pre-programmed device 24 may be configured to pair with the remote electronic device, which may include communicating bi-directionally and storing information in the pre-programmed device 24. This pairing does not involve training the pre-programmed device 24 to identify multiple control formats and to selectively communicate according to the multiple control formats. Instead, this pairing involves exchanges that occur in accordance with the multiple control formats and in accordance with the programming installed at manufacture of the pre-programmed device 24.

As discussed herein, when the conventional trainable transceiver detects a message consisting of multiple data formats, it either will not train at all, or it will train to just one of the data formats, in which case there is a chance that it will train to the data format that the receiver is not using, and therefore will not be able to operate the opener.

In one embodiment according to the present disclosure, a trainable transceiver (or remote device) is provided that may capture data encompassing two or more data formats, possibly a large amount of data containing more than one message for each of the two or more data formats. The trainable transceiver may reorganize multiple data formats within the captured data and configure itself to output messages utilizing all of the recognized formats. In one embodiment, the same rolling code counter may be utilized for all of the messages output by the trained channel according to the plurality of recognized data formats.

I. Overview

The remote device 120 may include a processor 130, memory 134, power supply circuitry 131, an input/output interface 136, and a communication interface 132. The power supply circuitry 131 may be coupled directly to a power source of another object, such as a vehicle 10. Alternatively, the power supply circuitry 131 may include a battery such that no external source of power is utilized for operation.

The input/output interface 136 may include one or more communication interfaces in addition to the communication interface 132, including wired and/or wireless interfaces. Examples of communication interfaces include discrete or analog inputs, discrete or analog outputs, $I^2C$ or other serial and wired interfaces, Bluetooth® transceivers, Wi-Fi transceivers, ZigBee transceivers, Z-Wave transceivers and 6LoWPAN transceivers. The communication interface 132, as described herein, may be coupled to a communication antenna 138 and capable of communicating wirelessly according to a protocol compatible with the remote electronic device 22. With the communication interface 132, the processor 130 may transmit and receive information or messages to and from the remote electronic device 22. The processor 130 and memory 134 may be incorporated into a microcontroller, such as a Microchip PIC series microcontroller. It should be understood that the processor 130 and memory 134 may be separate devices depending on the application. The processor 130 may be configured to execute instructions retrieved from memory 134, including changing outputs and saving information in memory, permanently or temporarily, for use at a later stage in processing or conveying information to a user.

The processor 130 and memory 134 may be configured to utilize the communication interface 132 to communicate wirelessly with the remote electronic device 22. In one embodiment, the processor 130 and memory 134 may be configured for a training phase or mode in which a frequency and bit code format used by the remote electronic device 22 are determined and stored as connection parameters. This information can be obtained from the pre-programmed device 24 associated with the remote electronic device 22, such as by sniffing information transmitted from the pre-programmed device 24 to the remote electronic device 22.

The operational frequency band for communications with the barrier operator 22 may vary from application to application based on communication parameters obtained during the training phase. As an example, the frequency band may be between 286 MHz and 440 MHz with bands therein that may be avoided. In another example, the frequency band may allow bidirectional communications at larger power levels, such as a frequency band higher than 440 MHz. In one embodiment, the frequency band for communication with the barrier operator 22 may be in the range of 902-928 MHz, such as in the case of communications with the Chamberlain MyQ.

In the illustrated embodiment, the input/output interface 136 may be operably coupled to the user interface 122 to receive input from a user such as a vehicle operator, and optionally coupled to a display 124 to provide information to the user. The user interface 122 may include a plurality of discrete inputs, each associated with a function or inputs with multiple function capabilities that enable a user to select or direct operation of the remote device 120. The display 124 may enable the control system 120 to aid the user in operating the user interface 122, or displaying status information relating to the status messages received from the remote electronic device 22. Additionally, or alternatively, the display 124 may provide video information, such as video information obtained from a rearview camera of a vehicle. The display 124 may be at least one of an LED and LCD display and may be incorporated into a rearview mirror of a vehicle. In this configuration, one or more aspects of the display 124 may be selectively visible depending on whether they are activated. Alternatively, the display 124 may be separate from the rearview mirror 102.

II. Training for Multi-Protocol Messaging

Figure 7:
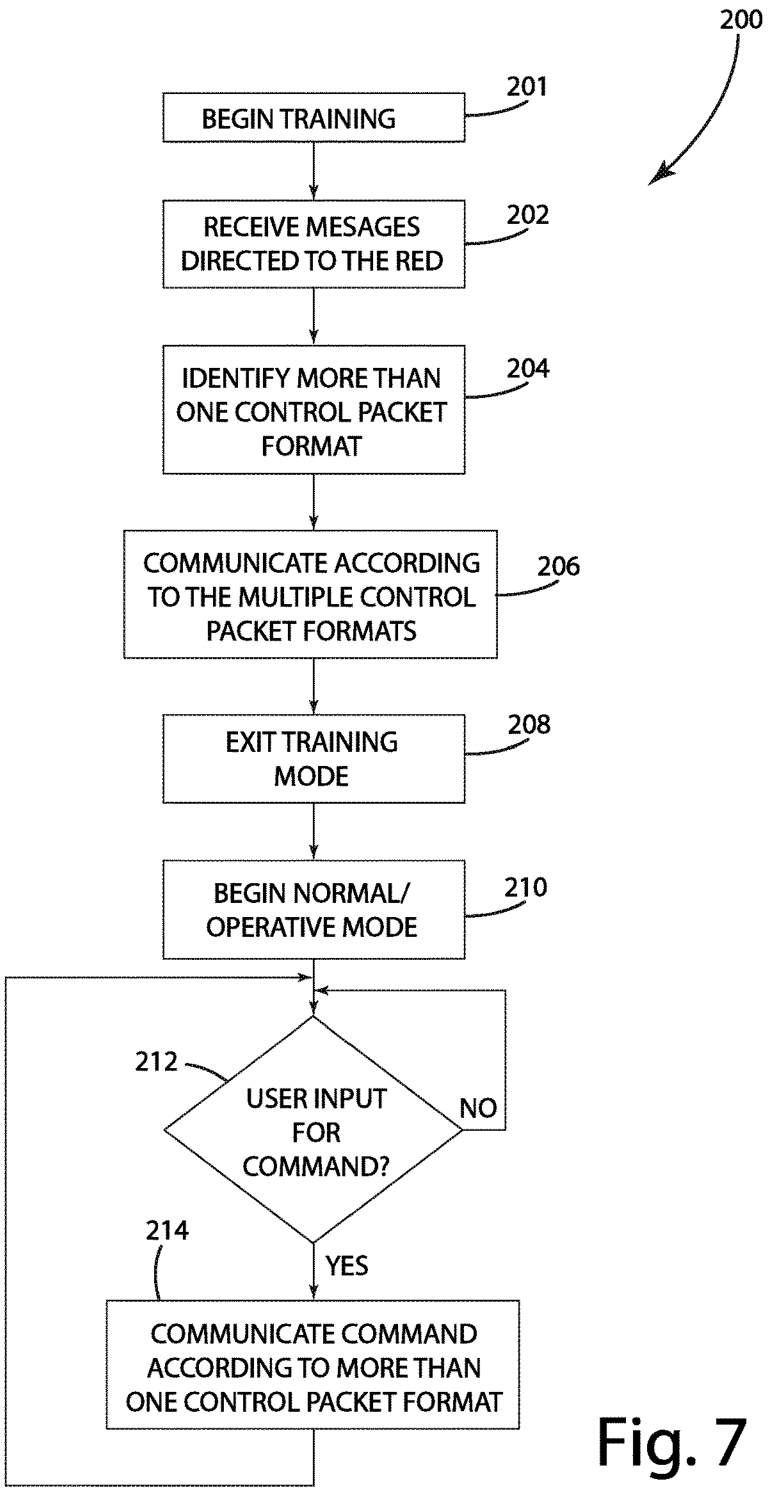
FIG. 7 depicts a method of communicating with a remote electronic device in accordance with one embodiment.

A method according to one embodiment of the present disclosure is shown in FIG. 7 and designated 200. The method includes training the remote device 120 based on communications sniffed between the pre-programmed device 24 and the remote electronic device 22. Communications may be sniffed by the communication antenna 138 and provided to the communication interface 132 of the remote device 120 for processing. In the illustrated embodiment, the communications directed from the pre-programmed device 24 to the remote electronic device 22 include data arranged according to a plurality of control packet formats, such as the packet stream identified in the illustrated embodiment of FIG. 4.

Figure 4:
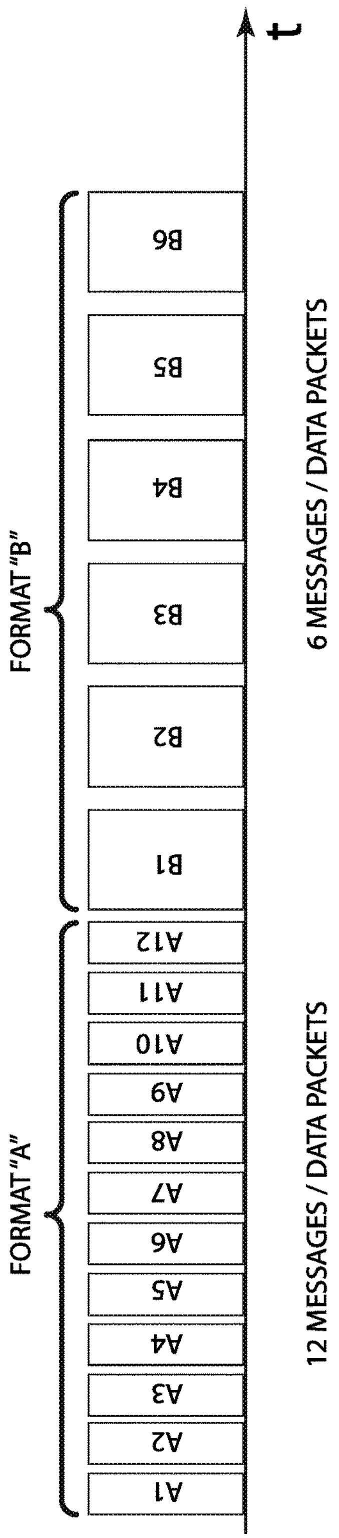
FIG. 4 shows communications from a transmitter according to one embodiment.

As discussed herein, data communicated from the pre-programmed device 24 may be provided according to a plurality of control packet formats to facilitate interoperability with respect to the pre-programmed device 24 and multiple types of remote electronic devices 22. The illustrated embodiment of FIG. 4 depicts a packet stream with 12 messages or data packets according to a first type of control packet format (format "A") and 6 messages according to a second type of control packet format (format "B"). In other words, the illustrated embodiment of FIG. 4 shows the output of a transmitter that supports two data formats. The transmitter in this case outputs 12 messages/frames of an older format "A" followed by 6 messages of a newer format "B". This sequence may repeat until the button of a user interface is released. A conventional transmitter, e.g., a conventional HomeLink configuration may either train to format "A" or format "B", or would not train at all. The remote device 120 according to one embodiment herein may train to and output both formats so that regardless of which format the receiver of the remote electronic device 22 is designed to work with, the trained remote device 120 is capable of activating it. The remote device 120 may be incorporated into the HomeLink system to provide such capabilities.

In one embodiment, transmission of data according to multiple control packet formats may involve communicating instructions to a remote electronic device 22 that understands one but not the other type of control packet format. For instance, a first type of remote electronic device 22 may be configured to receive and understand format "A" messages but not format "B" messages. A different, second type of remote electronic device 22 may be configured to receive and understand format "A" messages but not format "B" messages. The term "understand" as used in conjunction with the remote electronic device 22 means the remote electronic device 22 may a) decrypt and/or decode content of the message (e.g., to confirm authorization with respect to the message) and b) associate a command provided in the message with an action to be initiated by the remote electronic device 22. In order to facilitate interoperability with both the first and second types of remote electronic devices 22, the remote device 120 may transmit communications according to both "A" and "B" formats. At least one of the data packets in this communications may be understood by both the first and second types of remote electronic devices 22 so that a command provided in the communications can be processed and performed.

In accordance with one embodiment of the present disclosure, several types of control packet formats may be utilized for communications with the remote electronic device 22. An example of a control packet format and variations thereof is depicted in the illustrated embodiment of FIG. 5 and generally designated 50. The control packet format 50, also described herein as format "A", includes a plurality of bits arranged as follows: a preamble 55, encrypted data 54, and unencrypted data 53. It should be understood that the bits may be arranged differently, and may or may not include the preamble 55 or the unencrypted data 53, or a combination thereof. The plurality of bits may be transmitted from right to left so that the preamble 55 is transmitted first. The control packet format 50 may also define a mode of transmitting the plurality of bits—for instance, the control packet format 50 may define an encoding scheme for the bits, a transmission scheme including a rate of transmission.

In the illustrated embodiment, the unencrypted data 53 includes command information 51 and an identifier 52 indicative of an identity of the transmitting device. The encrypted data 54 may include a plurality of bits generated from an encryption function 56 based on a shared key 57 and a rolling code 58. The shared key 57 may be exchanged or provided to both the remote electronic device 22 and the transmitting device (e.g., the remote device 120 or the pre-programmed device 24). The rolling code 58 may be a counter that increments and rolls over to 0 in an overflow condition. This type of counter and encryption is utilized in many transmitters capable of encoding according to the KeeLoq code hopping technique. The rolling code 58 may be utilized as an authorization code so that, if the rolling code 58 matches a corresponding code in the remote electronic device 22, the remote electronic device 22 may determine the command included in the message is authorized. Alternatively, the rolling code 58 may be any type of authorization code that may be encrypted according to the encryption function 56, and then decrypted and analyzed for authorization by the remote electronic device 22.

Based on the control packet format 50, the remote device 120 or the pre-programmed device 24 may generate a data packet or message for transmission to the remote electronic device 22. The message may be communicated in a variety of ways as defined by the control packet format 50. For instance, the message may be transmitted with pulse width modulation encoding according to a 20 kHz clock and amplitude shift keying.

It should be understood that the control packet format 50 may vary from application to application, even among different offerings from the same manufacturer. As discussed herein, in one embodiment, a manufacturer may adapt a new control packet format for a new type of remote electronic device 22 that is different from a control packet format 50 of an older type of remote electronic device 22. In many cases, the pre-programmed device 24 is provided separately from the remote electronic device 22, whereby the pre-programmed device 24 may be specifically programmed to communicate messages according to both types of control packet formats 50, the new and the old. An example of this communication is shown in the illustrated embodiment of FIG. 4.

Figure 5:
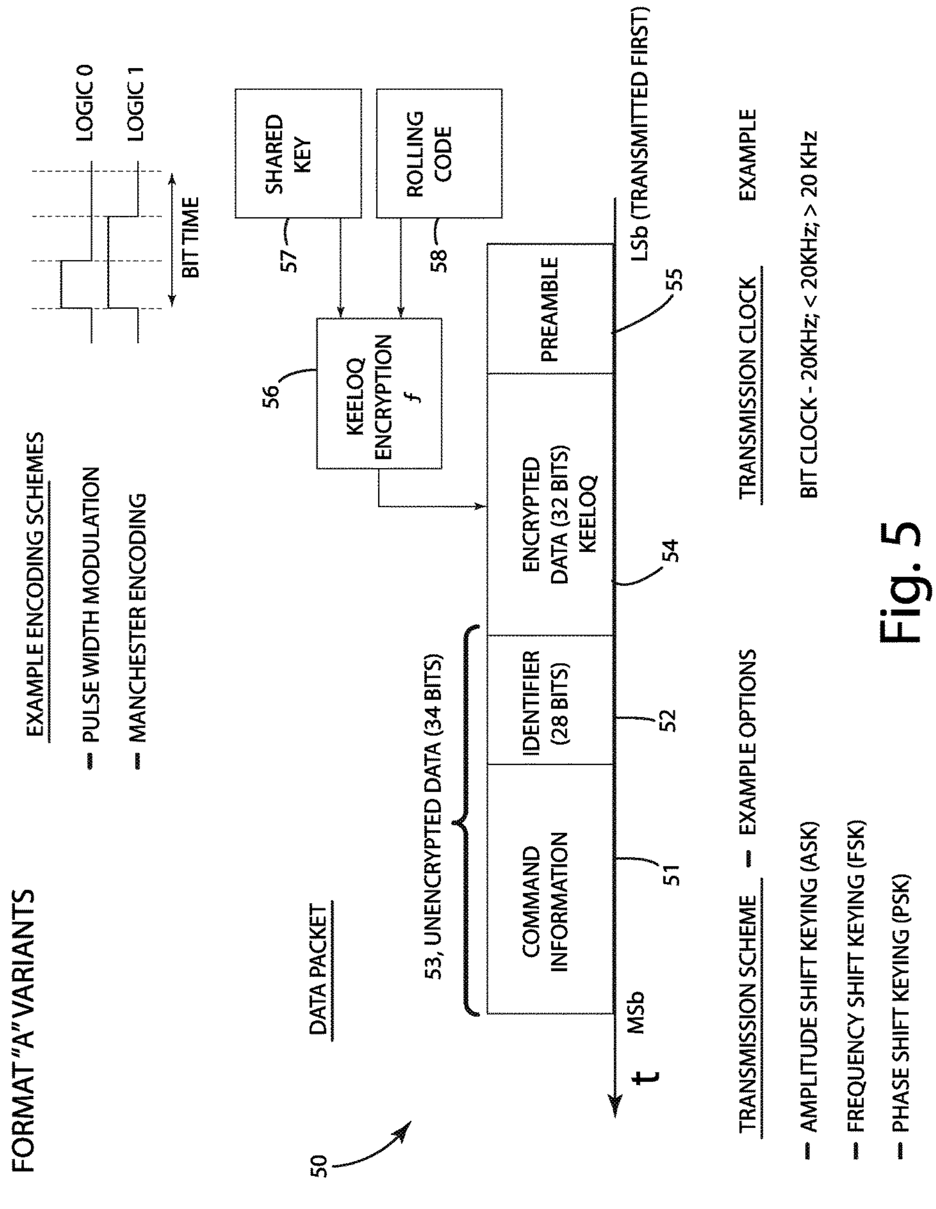
FIG. 5 shows a data packet format or control packet format in accordance with one embodiment.
Figure 6:
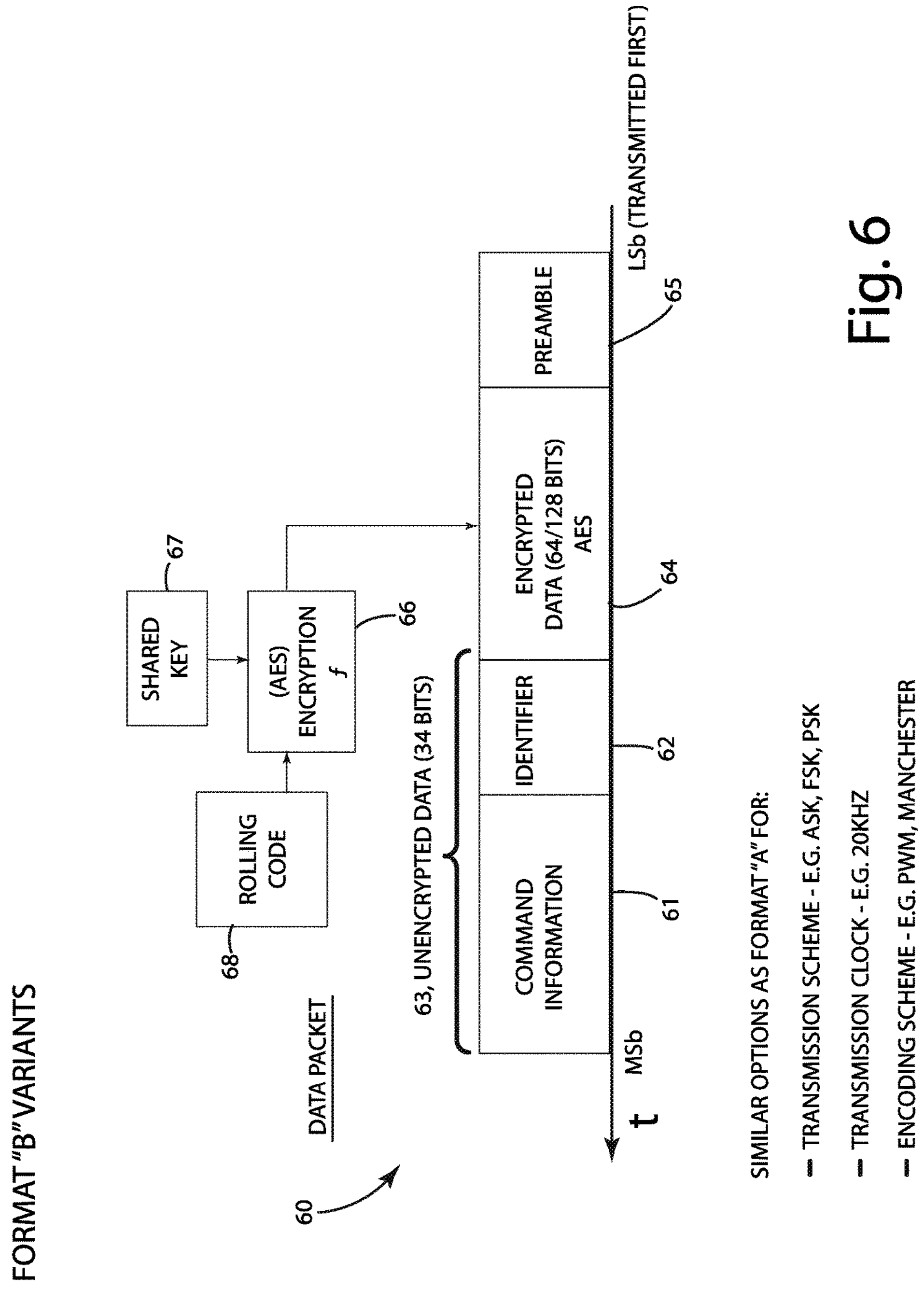
FIG. 6 shows a data packet format or control packet format in accordance with one embodiment.

An alternative, different control packet format from that described in connection with FIG. 5 is shown in the illustrated embodiment of FIG. 6 and designated 60. The control packet format 60, also described as format "B" herein, may be similar in many respects to the control packet 50 but with several differences. For instance, the control packet 60 may include a plurality of bits arranged according to a preamble 65, encrypted data 65 and unencrypted data 63. The encrypted data 64 may be based on encryption of a rolling code 68 (or other type of authorization code) and a shared key 67 based on an encryption algorithm 66. The encryption algorithm 66 in the illustrated embodiment is the AES symmetric encryption algorithm—although any type of encryption algorithm may be utilized. For example, the control packet format 60 in the illustrated embodiment may be different from the control packet format 50 through use of a different encryption algorithm. As new or more secure encryption algorithms are developed, a new control packet format may be developed to utilize such encryption algorithms. Alternatively or additionally, the keying technique, transmission clock, or encoding scheme, or a combination thereof, that is defined by the control packet format 60 may be different from that defined by the control packet format 50.

Additionally, or alternatively, the arrangement and meaning of bits included in the control packet format 60 may be different from the meaning of the bits included in the control packet format 50. For instance, the command information included in one type of data packet may be formatted differently from the command information included in another type of data packet.

Returning to the illustrated embodiment of FIG. 7, the remote device 120 may be configured to recognize and associate messages in a wireless signal according to more than one type of control packet format. This way, the remote device 120 may learn to substantially mimic the output of the pre-programmed device 24 according to a plurality of control packet formats. This may avoid identification of only one type of control packet format in the wireless signal transmitted from the pre-programmed device 24, and subsequent efforts to communicate with the remote electronic device 22 according to the recognized control packet format when that recognized control packet format happens to be incompatible with the remote electronic device 22.

In the illustrated embodiment of FIG. 7, the remote device 120 may operate in a training mode to receive messages (e.g., the messages depicted in the illustrated embodiment of FIG. 4) transmitted from the pre-programmed device 24 to the remote electronic device (RED) 22. Step 202. The training mode may be initiated through the user interface 122—and optionally, start an operational sequence in the remote device 120 that trains the remote device 120 based on this single action or based on no further input to the user interface 122.

The processor or trainable controller 130 of the remote device 120 may analyze the received messages to identify more than one type of control packet format, such as a format "A" message and a format "B" message. Step 204. The received messages may include more than one message for each type of control packet format (e.g., 12 format "A" messages). Identification of more than one type of control packet format may include identifying candidate data packets based on identification of a characteristic indicative of the start of a new data packet, such as a time delay between data packets consistent with a guard time or separation between data packets. In practice, the guard time may be time in which no bits are communicated or the signal remains constant.

The trainable controller 130 may compare each of the messages against one or more criteria for each of a plurality of control packet formats obtained from the memory 134. The one or more criteria may vary for each of the plurality of control packet formats. For instance, it may be known that one type of control packet format utilizes a Manchester encoding scheme at a 15 kHz clock. Matching both of these criteria may be sufficient for associating a message with this type of control packet format (e.g., without analysis of the bits included in the message). As another example, two or more types of control packet formats may utilize a PWM encoded scheme at 20 kHz using ASK transmission. However, these two or more types of control packet formats may include other distinguishing features—e.g., one type of control packet format may include a 168 bit (21 byte) message whereas another type of control packet format may include a 72 bit (9 byte) message. Alternatively, or additionally, the structure or content of unencrypted bits (and/or encrypted bits) may be indicative of one type of control packet format over another. If a received message matches the one or more criteria associated with a control packet format, the message may be identified as that type of control packet format. The trainable controller 130 may compare a message against the one or more criteria for each control packet format from memory 134 in order to find one or more matches. Alternatively, the trainable controller 130 may identify groups of candidate control packet formats based on one or more similar criteria within the group, and then compare one or more criteria associated with the candidate control packets to further narrow the search until one or more control packet formats are identified with the message.

It is possible for two types of control packet formats to be substantially indistinguishable from each other without having access to an encryption key or some other information to analyze the content or data of a message. Two types of control packet formats may also be indistinguishable from a criteria perspective, where the one or more criteria for identifying both control packet formats are the same. In such a circumstance, the trainable controller 130 may associate a message with two or more control packet formats. This way, when the trainable controller 130 proceeds to try to associate itself with the remote electronic device 22, at least one of these two or more control packets is likely to be the correct type of control packet format for effective communication with the remote electronic device 22. The trainable controller 130 may utilize these at least two types of control packets formats for communication in addition to any other control packet formats identified in conjunction with the messages received during the training mode.

Based on identification of the plurality of control packet formats associated with the messages transmitted from the pre-programmed device 24, the trainable controller 130 may store in the memory 134 communication parameters for each of the identified control packet formats, such as an identifier for use of each control packet format in conjunction with transmission of communications to the remote electronic device 22.

The remote device 120, still in the training mode, may attempt to communicate with the remote electronic device 22 according to the plurality of control packet formats identified in Step 204. Step 206. The remote device 120 may utilize its own shared key 57 unique from the shared key utilized by the pre-programmed device 24. Alternatively, the shared key 57 may form part of one or more of the criteria for the control packet format so that the identification process may include confirmation that the shared key 57 can be used to correctly decrypt the encrypted data of the message. For instance, it may be known that a manufacturer's garage door operator utilizes one or more shared keys for communications—these shared keys may be obtained from the manufacturer, stored in the memory 134, and associated with a control packet format.

During Step 206, the remote device 120 may negotiate to pair with the remote electronic device 22 so that, in an operative mode, the remote device 120 may communicate a message to the remote electronic device 22 that effectively results in the remote device 22 operating according to a command instruction contained in the message. The negotiation may be specific to the type of control packet format being used. For instance, the negotiation may be one-way or two-way, and may include providing a rolling code (or other authentication code) to the remote electronic device 22, such as in a KeeLoq-based system. The negotiation, as discussed herein, may include transmission of more than one message according to the plurality of control patent formats identified at Step 204. This way, the remote device 120 can substantially increase the likelihood that at least one of the messages will be understood by the remote electronic device 22 and pairing can be established with the remote electronic device 22 according to the control packet format. The negotiated information for pairing with the remote electronic device 22 may be stored in the memory 134 as communication parameters.

For instance, if the identified control packet formats are the KeeLoq format and a proprietary AES-based format, the remote device 120 may communicate messages to the remote electronic device 22 according to both control packet formats. During the pairing stage, the remote electronic device 22 may recognize only the proprietary AES-based format and subsequently, in an operative mode, respond only to the AES-based messages included in both KeeLoq and AES-based communications to the remote electronic device. The KeeLoq message may be ignored in this example.

After the training stage and pairing with the remote electronic device 22 is complete, the remote device 120 may transition to an operative mode. Steps 208, 210. The remote electronic device 120 may wait until the user interface 122 is activated for a command request. Step 212. In response to the command request, the remote electronic device 120 may transmit communications including more than one message in accordance with the plurality of control packet formats identified for use with the command request and the communication parameters stored in memory 134.

III. Barrier-Type Applications for Vehicles

Figure 2:
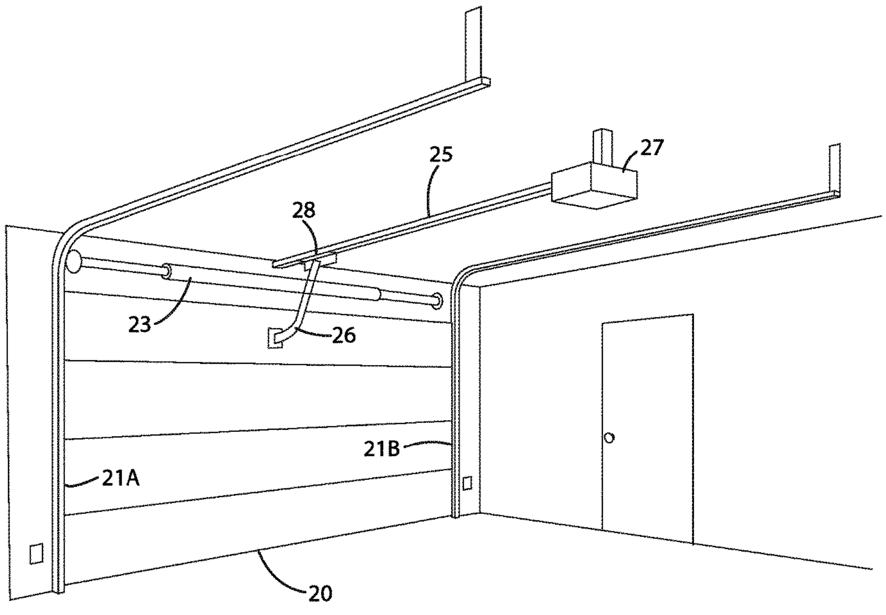
FIG. 2 depicts a barrier operator system in accordance with one embodiment.
Figure 3:
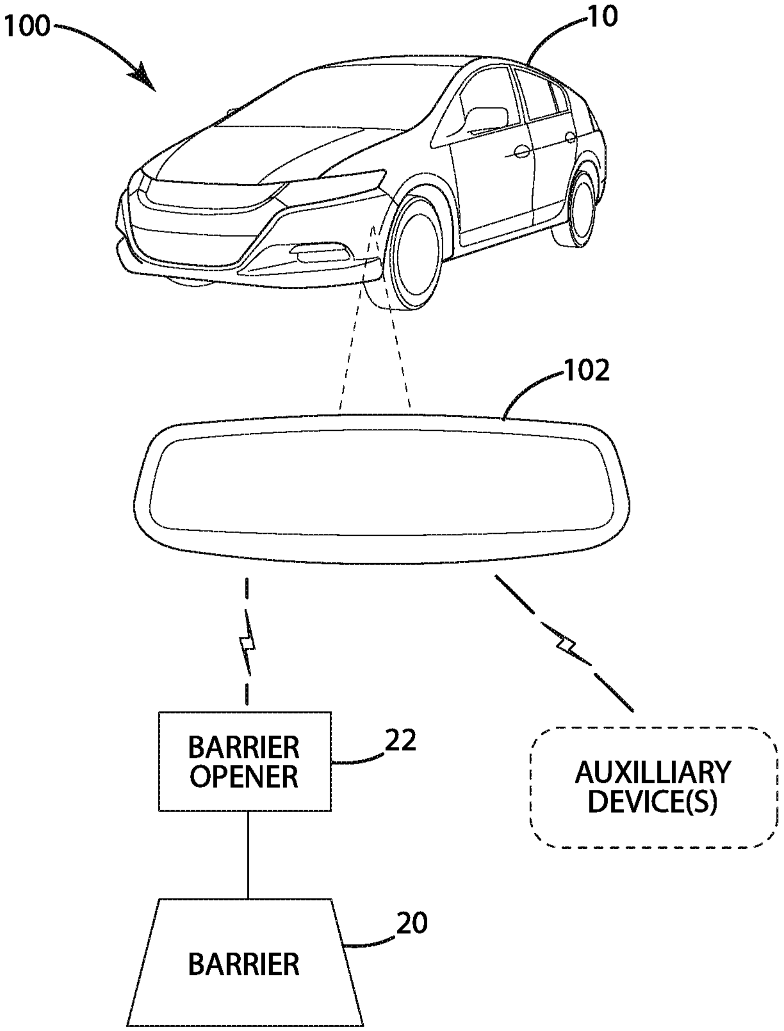
FIG. 3 shows the communication system incorporated into a vehicle.

In the illustrated embodiments of FIGS. 2 and 3, a communication system 100 with the capability to train on multiple types of messages from a pre-programmed device 24 and transmit messages according to multiple control packet formats to a barrier operator is shown. For purposes of disclosure, the communication system 100 is described as communicating with a single barrier operator, but it should be understood that the embodiments herein may operate in conjunction with multiple barrier operators. For instance, the communication system 100 may be configured to communicate with two separate garage door operators, or a front gate controller and a garage door operator. Although the communication system 100 is described herein in conjunction with communicating with a barrier operator 27, the communication system 100 may communicate with other devices or auxiliary devices, such as building automation devices or other wirelessly accessible devices such as electronic toll collection systems and Bluetooth® capable smartphones, or any combination thereof. The communications may include a request for an equipment operation or action from the remote electronic device 22.

The barrier operator 27 may be any type of operator, such as the MyQ garage door opener manufactured by Chamberlain Corporation, that is capable of operating the barrier 20 to move from a first position to a second position. As an example, the barrier operator 27 may be configured to move the barrier 20 from a closed position to an open position. The barrier operator 27 may be coupled to a barrier driver 25 configured to facilitate movement of the barrier 20. An example of this configuration can be seen in FIG. 2, which depicts a garage door operator system. The barrier 20 in the illustrated embodiment is a paneled garage door guided by door rails 21*a-b*, and the barrier operator 27 is a head unit mounted to the ceiling of the garage. The barrier driver 25 includes a releasable trolley 28 with an arm 26 coupled to the garage door. The releasable trolley 28 may be actuated by the barrier operator 27, via a chain or belt coupled to the releasable trolley 28, to effect movement of the garage door from a closed position to an open position along the door rails 21*a-b*. Conversely, the barrier operator 27 may control movement of the releasable trolley 28 to move the garage door from the open position to the closed position along the door rails 21*a-b*. A spring 23 coupled to the garage structure and the garage door may facilitate movement between the open and closed positions.

The barrier operator 27 may include the remote electronic device 22 capable of wirelessly communicating with the remote device 120. Wireless communication may be 2-way or 1-way, and may include communications according to one or more control packet formats.

The communication system 100 may be trained or configured to store in memory communication parameters, such as a rolling key algorithm associated with the barrier operator 27, for use with more than one type of control packet formats. Storage of the communication parameters may be conducted during an association phase with the barrier operator 22, where the communication system 100 is paired with the barrier operator 27. For instance, the remote device 120, as discussed herein, may sniff communications from the pre-programmed device 24 and determine that the remote electronic device 22 of the barrier operator 27 responds to communications according to more than one type of control packet format, e.g., a KeeLoq-type of packet and a proprietary AES-based type of packet.

In one embodiment, all or a portion of the communication system 100 may be incorporated into a vehicle 10, as shown in the illustrated embodiment of FIG. 3. More specifically, the remote device 120 may be incorporated into the vehicle, possibly within a rearview mirror 102 of the vehicle. This way, a vehicle operator may command the remote device 120 via the user interface 122 to transmit a command to the barrier opener 27 to operator the barrier 20 requesting opening or closing of the barrier 20.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A remote device configured to control operation of a remote electronic device, said remote device comprising:

a memory configured to store a plurality of communication parameters pertaining to controlling operation of the remote electronic device, each of said communication parameters corresponding to a control packet format;

a transmitter circuit configured to receive and transmit communications directed to the remote electronic device, said communications received by said transmitter circuit including a data packet arranged according to a plurality of the control packet formats;

a trainable controller operably coupled to said memory and said transmitter circuit, said trainable controller configured to operate in a training mode in which said transmitter circuit receives a training data packet, wherein said training data packet includes data arranged according to a first control packet format and a second control packet format; and said trainable controller configured to determine one or more communication parameters for at least one of said first and second control packet formats based on said data provided in said training data packet, said trainable controller configured to operate in an operative mode in which said trainable controller directs said transmitter circuit to communicate an operative data packet arranged according to at least one of said first control packet format and said second control packet format and based on said one or more communication parameters.

2. The remote device of claim 1 wherein said data communicated according to the plurality of control packet formats includes a first packet type and a second packet type in the same transmission.

3. The remote device of claim 2 wherein said memory is configured to store one or more criteria for each of the first packet type and the second packet type; and wherein said trainable controller is configured to identify a data packet as the first packet type based on a plurality of bits of said data packet matching said one or more stored criteria for the first packet type.

4. The remote device of claim 3 wherein said first packet type includes an encrypted portion and an unencrypted portion, wherein said one or more stored criteria for the first packet type include bit criteria relating to a message format of the unencrypted portion.

5. The remote device of claim 3 wherein said data includes a plurality of data packets according to the first packet type and a plurality of data packets according to the second packet type.

6. The remote device of claim 5 wherein said trainable controller is configured to identify the plurality of data packets corresponding to the first packet type based on bits of each of said plurality of data packets matching said one or more stored criteria for the first packet type.

7. The remote device of claim 2 wherein said first packet type includes an authorization code encrypted according to a first encryption algorithm.

8. The remote device of claim 7 wherein said second packet type includes an authorization code encrypted according to a second encryption algorithm.

9. The remote device of claim 7 wherein the first encryption algorithm is the KeeLoq algorithm.

10. The remote device of claim 8 wherein the second encryption algorithm is AES.

11. The remote device of claim 1 wherein said operative data packet transmitted to the remote electronic device by said transmitter circuit is arranged according to at least one of the first and second control packet formats and includes a command instruction pertaining to an equipment operation from the remote electronic device.

12. The remote device of claim 1 wherein the remote electronic device is a barrier operator configured to open and close a barrier.

13. A method of operating a remote electronic device, said method comprising:

operating in a training mode in which the remote electronic device wirelessly receives a training data packet, the training data packet including data arranged according to a first control packet format and a second control packet format;

determining a plurality of communication parameters based on the training data packet, the plurality of communication parameters corresponding to at least one of the first control packet format and the second control packet format; and operating in an operative mode in which the remote electronic device wirelessly transmits an operative data packet, the operative data packet including an equipment command for operation of the remote electronic device, wherein the operative data packet transmitted wirelessly includes data based on at least one of the plurality of communication parameters and arranged according to at least one of the first control packet format and the second control packet format.

14. The method of claim 13 wherein said operating in the training mode includes receiving a plurality of first data packets corresponding to the first control packet format and a plurality of second data packets corresponding to the second control packet format in the same transmission.

15. The method of claim 13 comprising providing one or more criteria for each of the first control packet format and the second control packet format.

16. The method of claim 15 comprising identifying a data packet as the first control packet format based on a plurality of bits of the data packet matching the one or more criteria for the first control packet format.

17. The method of claim 16 comprising:

determining at least one communication parameter based on the data packet identified as the first control packet format, said determining the at least one communication parameter including determining an authorization code for authorizing operation of the remote electronic device; and storing the at least one communication parameter in memory.

18. The method of claim 16 wherein the first control packet format includes an encrypted portion and an unencrypted portion, wherein said identifying the data packet as the first control packet format includes identifying a message format of the unencrypted portion matching the one or more criteria for the first control packet format.

19. A vehicle for communicating a command to a remote electronic device, said vehicle comprising:

a transmitter circuit configured to receive and transmit communications directed to the remote electronic device, said communications received by said transmitter circuit including a data packet arranged according to a plurality of control packet formats;

a trainable controller operably coupled to said transmitter circuit, said trainable controller configured to operate in a training mode in which said transmitter circuit receives a training data packet, wherein said training data packet includes data arranged according to a first control packet format and a second control packet format; and said trainable controller configured to determine one or more communication parameters, based on said data provided in said training data packet, for at least one of said first and second control packet formats, said trainable controller configured to operate in an operative mode in which said trainable controller directs said transmitter circuit to communicate an operative data packet arranged according to at least one of said first and second control packet formats and based on the one or more communication parameters, said data communicated from said transmitter circuit including a command instruction corresponding to the command for the remote electronic device.

20. The vehicle of claim 19 wherein the remote electronic device is a barrier operator.

* * * * *